United States Patent [19]
Fujimori et al.

[11] Patent Number: 6,117,555
[45] Date of Patent: Sep. 12, 2000

[54] WATER REPELLENT COATING COMPOSITION, AND COATED FILMS AND COATED ARTICLES USING THE SAME

[75] Inventors: Susumu Fujimori, Tokyo; Masaya Takahashi, Tokorozawa; Mamoru Ishitani, Matsudo; Shinji Tsuru, Higashimurayama; Akira Iwasawa, Kamakura; Fumio Yamamoto, Hitachinaka; Satoru Kurosawa, Kokubunji, all of Japan

[73] Assignee: Nippon Telegraph and Telephone Corporation, Tokyo, Japan

[21] Appl. No.: 08/839,781

[22] Filed: Apr. 16, 1997

[30] Foreign Application Priority Data

Apr. 17, 1996 [JP] Japan .................................. 8-118190

[51] Int. Cl.[7] .......................... B32B 27/06; B32B 27/18; B32B 27/30; C08L 27/18
[52] U.S. Cl. .......................... 428/421; 428/422; 428/447; 428/522; 525/199; 525/209; 525/221; 525/222
[58] Field of Search ..................... 428/421, 422, 428/447, 522; 525/199, 209, 221, 222

[56] References Cited

FOREIGN PATENT DOCUMENTS

| | | |
|---|---|---|
| 3-244680 | 10/1991 | Japan . |
| 3-244681 | 10/1991 | Japan . |
| 4-273991 | 9/1992 | Japan . |
| 6-122838 | 5/1994 | Japan . |
| 06296924 | 10/1994 | Japan . |
| 06306626 | 11/1994 | Japan . |
| 07166122 | 6/1995 | Japan . |
| 08118190 | 5/1996 | Japan . |
| 08206383 | 8/1996 | Japan . |

*Primary Examiner*—Vivian Chen
*Attorney, Agent, or Firm*—Venable; Robert J. Frank; Ashley J. Wells

[57] ABSTRACT

A water repellent coating composition comprises a fluororesin powder having a specific surface area ranging from 27 to 48 $m^2/g$ and a molecular weight ranging from 10,000 to 100,000; an acrylic-silicone binder resin; and a solvent. The fluororesin may be preferably at least one resin selected from polytetrafluoroethylene resins, tetrafluoroethylene/perfluoro(alkyl vinyl ether) copolymer resins, and tetrafluoroethylene/hexafluoropropylene copolymer resins. The coating composition can be used in various fields including constructions, civil engineering, transportation, communication. The coating films and coated articles produced with the water repellent coating composition exhibit excellent water repellency, antisnow- or antiice-sticking properties, and weatherability.

9 Claims, 15 Drawing Sheets

WATER REPELLENT COATING COMPOSITION, AND COATED FILMS AND COATED ARTICLES USING THE SAME

BACKGROUND OF THE INVENTION

1. Field of the Invention

The present invention relates to a water repellent coating composition having excellent water repellency, antisnow-sticking and weatherability, coating films and coated articles using such a water repellent coating composition.

The water repellent coating composition can be used widely including construction, civil engineering, etc. because of high water repellency, antisnow- or antiice-sticking properties, and weatherability.

The present invention is applicable to prevention of leakage of water or antisnow- or antiice-sticking surface treatment for various antennae, e.g., antennae for satellite communication and satellite broadcasting, antenna domes for communication, antennae for flight control, Yagi antennae and the like. Also, the present invention can be applied to reflector plates for radars and radiotelescopes, iron towers, cables, transmission lines, constructions and facings thereof, such as houses, buildings, roofs or outer walls thereof, vehicles such as electric cars, trains, automobiles, ships, airplanes, jigs for civil engineering machines, ventilation or exhaustion outlets of chimneys and stoves. The water repellent coating composition of the present invention can be provided in the form of a dispersion or as contained in a spray can.

2. Description of Related Art

Development of water repellent coating compositions having excellent water repellency, antisnow- or antiice-sticking property, and weatherability will enable realization of antennae, cables, towers, roofs and the like which are resistant to snow-sticking by coating such coating compositions thereon and will also find application to a wide such coating compositions will find their way into many uses including coating of jigs for civil engineering machines and the like. However, many of the conventional water repellent coating compositions or water repellent coating materials have initial contact angles of not higher than 140 degrees, which decrease considerably during use of the coated article, leading to loss of water repellency. There has been known a technology in which fluororesin powder is electro-deposited on the surface of a substrate to endow it with water repellency. In this technology, the electro-deposition is impossible on substrates such as constructions or articles outdoors so that its application has been limited. Also, it has been proposed to use fluororesin powder having a specified particle diameter in order to endow water repellency. However, the characteristics of powder are not defined by particle diameter alone but generally depend on various other factors and, hence, it is practically difficult to obtain deposition with a high performance by a mere control of the particle diameter of powder. Recently, a water repellent coating composition has been proposed which comprises a matrix resin such as an acrylic-silicone resin and a low molecular weight polytetrafluoroethylene (PTFE) powder with a molecular weight of 500 to 20,000 which is fluorinated to the ends thereof dispersed in the matrix resin Japanese Patent Application Laying-open No. 6-122838 (1994). The coated surface obtained with this coating composition had a contact angle of 140 degrees (°) or more and was considered to have excellent water repellency.

However, use of specific low molecular weight PTFE having fluorinated to the ends thereof in the water repellent coating composition mandates a special manufacturing process, which makes it difficult to produce the coating composition on a large scale, thus leading to high costs. Further, because of its low molecular weight, the water repellent powder used in the conventional water repellent coating composition has a relatively low melting point; although the melting point itself distributes in a certain range, the representative value thereof is 230° C. As a result, the conventional water repellent coating composition is weak to heat.

SUMMARY OF THE INVENTION

Therefore, an object of the present invention is to obviate the problems inherent to the above-described prior art and provide a water repellent coating composition having improved water repellency, antisnow- or antiice-sticking property and weatherability economically.

Another object of the present invention is to provide a coating film comprised by such a coating composition.

Still another object of the present invention is to provide a coated article coated with such a coating composition.

According to a first aspect of the present invention, there is provided a water repellent coating composition comprising:

a fluororesin powder having a specific surface area ranging from 8 to 50 $m^2/g$ and a molecular weight ranging from 10,000 to 100,000;

a binder resin; and a solvent.

Here, the fluororesin may be at least one resin selected from the group consisting of polytetrafluoroethylene resins, tetrafluoroethylene/perfluoro(alkyl vinyl ether) copolymer resins, and tetrafluoroethylene/hexafluoropropylene copolymer resins.

According to a second aspect of the present invention, there is provided a water repellent coating film comprising:

a fluororesin powder having a specific surface area ranging from 8 to 50 $m^2/g$ and a molecular weight ranging from 10,000 to 100,000; and a binder resin.

Here, fluororesin may be at least one resin selected from the group consisting of polytetrafluoroethylene resins, tetrafluoroethylene/perfluoro(alkyl vinyl ether) copolymer resins, and tetrafluoroethylene/hexafluoropropylene copolymer resins.

According to a third aspect of the present invention, there is provided a water repellent coated article comprising:

a substrate; and a coating film provided on said substrate, wherein said coating film comprises:

a fluororesin powder having a specific surface area ranging from 8 to 50 $m^2/g$ and a molecular weight ranging from 10,000 to 100,000; and a binder resin.

Here, the fluororesin may be at least one resin selected from the group consisting of polytetrafluoroethylene resins, tetrafluoroethylene/perfluoro(alkyl vinyl ether) copolymer resins, and tetrafluoroethylene/hexafluoropropylene copolymer resins.

Other and further objects, features and advantages of the present invention will become more apparent from the following description of preferred embodiments with reference to the accompanying drawings.

DETAILED DESCRIPTION OF THE INVENTION

Figure 1:
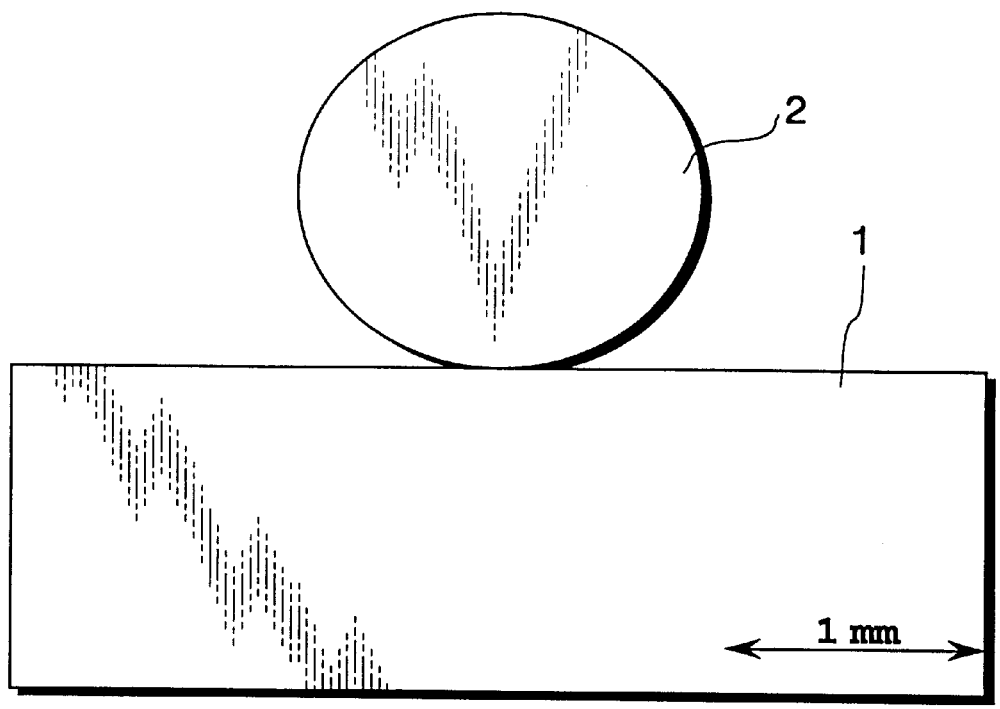
FIG. 1 is a schematic view showing a state of a water droplet on a coating film according to an embodiment of the present invention.
Figure 2:
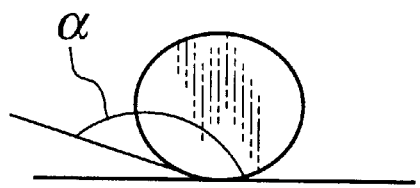
FIG. 2 is a schematic diagram illustrating measurement of contact angle of water.

FIG. 1 shows schematically a water droplet on a coating film according to an embodiment of the present invention, in which a coating film 1 bears a water droplet 2, in other words the water droplet 2 contacts the coating film 1. FIG. 2 is a schematic illustration of how to measure the contact angle of water. In FIG. 2, alpha designates a contact angle of a water droplet.

As for the shape and physical properties of fluororesin powder, it is considered that the more complicated uneven surface configuration the particles of the fluororesin powder, the greater the specific surface area of the powder while the closer to a perfect sphere the particles of fluororesin powder appear, the smaller the specific surface area thereof. On the other hand, lower molecular weight of the fluoro resin means a relatively larger number of polar groups, which are poor in water repellency. This is because polar groups having poor water repellency substitute at each end of a polymer chain at higher probabilities than at other midway portions of the polymer chain. Therefore, a decreasing molecular weight leads to an increasing difficulty for obtaining coating compositions having sufficiently high water repellency. In addition, it is technically difficult to produce fluororesin powder having a low molecular weight and containing a small number of polar groups, thus incurring high costs. On the contrary, use of fluororesin having a high molecular weight would lead to failure of obtaining uniform coating film because the particles of fluororesin powder have too large a particle diameter so that water repellency could decrease.

In view of the above, giving attention to the fact that major factors controlling the water repellency of a coating composition containing a fluororesin powder are the specific surface area and molecular weight of particles constituting the fluororesin powder, but less depending on particle diameter thereof, the present inventors have now found that use of a fluororesin powder having specified specific surface area and a specified molecular weight realizes a water repellent coating composition having excellent properties, without employing PTFE powder, which is fluorinated to the ends of its molecular chain. The present invention is based on this discovery.

That is, the water repellent coating composition of the present invention comprises a fluororesin powder having a specific surface area ranging from 8 to 50 m$^2$/g and a molecular weight ranging from 10,000 to 100,000, a binder resin, and a solvent. It has also been found that polytetrafluoroethylene resins, tetrafluoroethylene/perfluoro(alkyl vinyl ether) copolymer resins, tetrafluoroethylene/hexafluoropropylene copolymer resins and mixtures thereof can be used as the fluororesin advantageously.

The fluororesin powder used in the coating composition of the present invention is heat resistant. That is, the fluororesin powder has a relatively high melting point, although it distributes in a certain range, with its representative value, however, being 300° C.

Hereafter, the present invention will be described in detail.

In the present invention, the specific surface area of the fluororesin powder is selected to be ranging from 8 to 50 m$^2$/g. This is because outside this range there can be obtained no coating composition having sufficient water repellency. The reason for this is not clear but it is presumed that fluororesin powder having a specific surface area greater than 50 m$^2$/g has a complicated surface configuration of particles, more particularly, unevenness in surface, or degree of deviation (protrusions and depressions) from the surface of a perfect sphere, is to a considerable extent, so that proportion of molecules existing on the surface of particles to the total molecules increases. In other words, the abundance of exposed molecules increases. Accordingly, polar groups having poor water repellency contained in the particles of the powder are exposed in larger proportions so that the coating composition containing such particles of the fluororesin has higher affinity for water, thus having a decreased water repellency. On the other hand, the coating composition containing a fluororesin powder having a specific surface area of below 8 m$^2$/g has poor film forming properties because of its particle diameter being too large.

On the other hand, the molecular weight of the fluororesin powder is set to the range of from 10,000 to 100,000. If the molecular weight is below 10,000, the number of polar groups giving poor water repellency increases relatively so that coating compositions having high water repellency cannot be obtained. In addition, it is technically difficult to produce fluororesin powder having a low molecular weight and containing a small number of polar groups and, hence, production cost for such increases unavoidably. With the fluororesin powder having a high molecular weight as high as above 100,000, the particles in the powder are too large in size to afford a uniform coating film, so that the water repellency of the film decreases.

Fluororesin Powder

The fluororesin used in the water repellent coating composition of the present invention is a resin containing at least one fluorine atom in the molecule. Examples of preferred fluororesin include polytetrafluoroethylene (PTFE) resins, tetrafluoroethylene/hexafluoropropylene copolymer (FEP) resins, tetrafluoroethylene/perfluoro(alkyl vinyl ether) copolymer (PFA) resins in which the perfluoroalkyl group preferably contains 1 to 5 carbon atoms. The terminal ends of molecules of fluororesin do not have to be fluorinated and fluororesin powders prepared by a conventional method can also be used in the present invention.

Content of Fluororesin Powder

The content of the fluororesin powder in the water repellent coating composition of the present invention depends on the purpose for which the coating composition is used. Usually, it is preferred that the water repellent composition contain 1 to 95% by weight based on the total composition after evaporation of the volatile components such as solvents. If the content of the fluororesin powder is too small, the resulting coating film has an insufficient water repellency. On the contrary, use of too much a fluororesin powder results in a decrease in the mechanical strength of the resulting coating film.

Binder Resin

Examples of the binder resin which can be used in the present invention include acrylic-silicone resins, polyester resins, epoxy resins, acrylic resins, polyurethane resins, fluororesins, etc., and mixtures of two or more of them.

Additives

The water repellent coating composition of the present invention may if desired contain various additives such as colorants, antioxidants, ultraviolet light absorbers (UV stabilizers), dispersants for fluororesin powder, lubricants, and the like.

Solvent

As for the solvent which can be used in the water repellent coating composition of the present invention, there can be cited organic solvents conventionally used for coating compositions, such as butyl acetate.

The water repellent coating composition of the present invention can be prepared in the same manner as conventional coating compositions. More particularly, the fluororesin powder, binder resin and solvents for the binder resin and one or more optional additives are stirred and mixed in a ball mill, sand mill or the like mixing machine.

Coating Method

The water repellent coating composition of the present invention may be directly coated in the form of a suspension in a solvent onto a target object or article as by brush coating or it may be stored in a spray can, i.e., a can made of a metal such as aluminum until it is used by spraying. However, the manner of applying the composition of the present invention is not limited particularly and any conventional method for this purpose may be used.

The water repellent coating composition of the present invention may be coated directly on a target object or article without pretreatment. Alternatively, it may be coated after preliminary application of at least one resin selected from acrylic-silicone resins, polyester resins, epoxy resins, acrylic resins, urethane resins, phthalic acid resins, fluororesins, vinyl resins.

Target Object or Article

Figure 3:
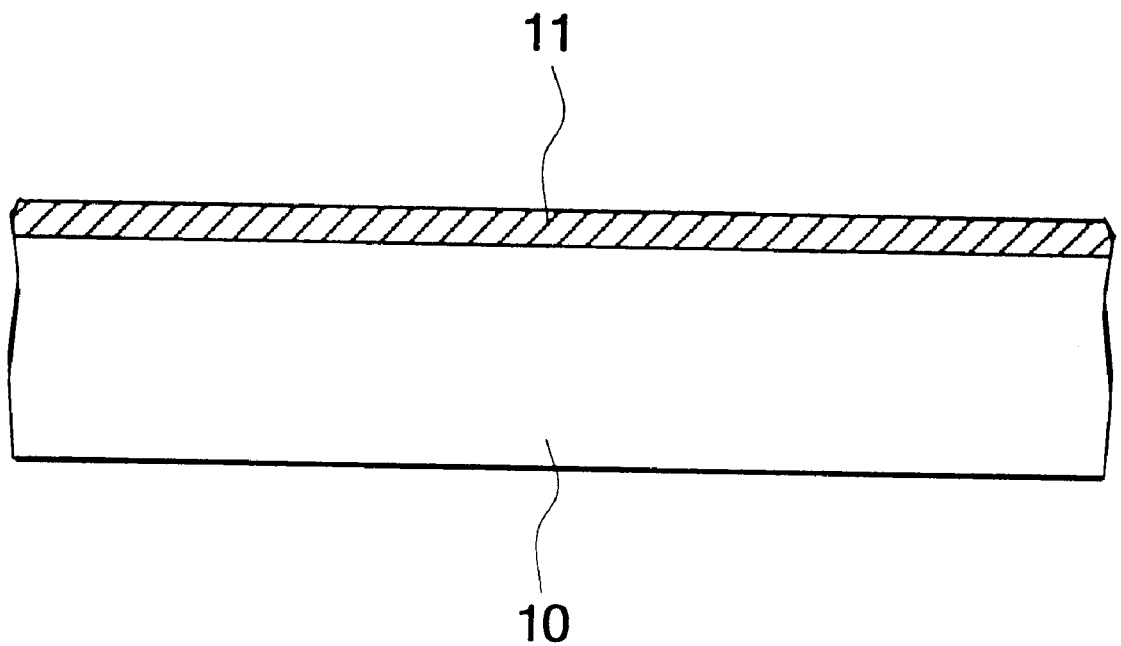
FIG. 3 is a cross sectional view schematically showing a part of a coated article coated with a coating composition according to an embodiment of the present invention.

Target object may be any object or article placed outdoors or used mainly outdoors that are desired to have water repellency, antisnow- or antiice-sticking properties, for example, surfaces of constructions, vehicles, and the like. The coating composition of the present invention can be applied to surfaces of large structures or of sheet-like or plate-like substrates. FIG. 3 is a schematic cross section of a coated article coated with the water repellent coating composition of the present invention. Reference numeral 10 designates a substrate and 11 is a coating film formed from the water repellent coating composition of the present invention. The substrate 10 may be of a sheet- or plate-like form or a part of a surface portion of a large structure or article.

Advantageous Effects

The water repellent coating composition of the present invention exhibits high water repellency and excellent weatherability so that it finds many uses such as prevention of fouling, snow hazards, icing, etc., in various fields including construction, civil engineering, communication systems, and so on.

More particularly, the water repellent coating composition of the present invention can be used in surface treatment for preventing leakage of water or antisnow- or antiice-sticking for various antennae, e.g., antennae for satellite communication and satellite broadcasting, antenna domes for communication, antennae for flight control, Yagi antennae and the like. Application of the water repellent coating composition to these antennae will obviate problems inherent to such antennae of deterioration of quality of transmission and reception caused by noises due to leakage of water, sticking of snow or ice, or the like. Also, when applied to reflector plates for radars and radiotelescopes, the water repellent coating composition of the present invention prevents an increase in noise level due to leakage of water or sticking of snow or ice, thus ensuring high precision observation or measurement. Further, iron towers, cables, transmission lines, protected with the water repellent coating composition of the present invention, will be free of possibilities of sticking of snow or ice thereto and thus of falling of such snow or ice falling therefrom so that dangers to houses or passers-by can be avoided. Similar advantageous effects can be obtained when the coating composition of the present invention is applied to constructions and facings thereof, such as houses, buildings, roofs or outer walls thereof. Also, application of the water repellent coating composition of the present invention to surfaces of the vehicles such as electric cars, trains, automobiles, ships, airplanes, and the like is useful not only for the prevention of the occurrence of dangers but also for saving fuel cost. Further, use of the coating composition of the present invention for coating ventilation or exhaustion outlets of chimneys and stoves effectively prevents clogging of the outlets due to icing.

The water repellent coating composition of the present invention can be provided in the form of a dispersion or as contained in a spray can for general purpose so that it is economical and easy to handle. Further, the composition of the present invention is advantageous as a coating composition since the components can be mixed well easily and will not separate soon. Therefore, it is only necessary to stir the mixture to a minimum extent before the composition of the present invention can be used. When colored materials are desired, pigments can be mixed with ease to form colored coating compositions with excellent color quality since pigments can be dispersed uniformly in the composition of the invention.

DESCRIPTION OF PREFERRED EMBODIMENTS

Hereafter, the present invention will be described more concretely by examples and comparative examples. However, the present invention should not be understood as being limited to the examples. In the examples and comparative examples, the kind of fluororesin powder and the method for the measurement of the physical properties of coating films are shown in Table 1 below and the following explanation.

In the examples and comparative examples, molecular weights, specific surface areas and contact angles were determined by the following methods.

Method for Measurement of Molecular Weights

Molecular weights were determined by measuring melt viscosity or viscosity of a solution.

Method for Measurement of Specific Surface Areas

Specific surface areas were determined by measuring adsorption isotherm of nitrogen gas at 77K on a high precision full automatic gas adsorbing apparatus "BELSORP 36" manufactured by NIPPON BELL CO., LTD. and calculating based on BET multi-molecule adsorption theory.

Measurement of Contact Angles of Water

Contact angles were determined by dropping 4 microliters of deionized water on a dry coating film surface formed from a water repellent coating and measuring angles using an automatic contact angle meter of CA-Z model manufactured by KYOWA KAIMEN KAGAKU CO., LTD. Measurements were conducted at room temperature (23° C.) five times each and average of five points were used.

EXAMPLE 1

PTFE powder (specific surface area: 24 $m^2/g$; molecular weight: 20,000) was mixed with an acrylic-silicone resin so that the PTFE powder after evaporation of volatile components occupy 70% by weight based on the total composition. The resulting composition was sprayed onto a surface of an FRP substrate. Contact angle of water of this sample measured is 153°. Then, the sample was exposed to ultraviolet rays for 400 hours using SUNSHINE WEATHER METER (corresponding to outdoor exposure for 2 years). Thereafter, contact angle of water of the sample was measured. The result was 148°, indicating that the sample exhibits excellent weatherability. Table 1 shows the results together with the results of other samples.

EXAMPLE 2

PTFE powder (specific surface area: 12 $m^2/g$; molecular weight: 30,000) was mixed with an acrylic-silicone resin so that the PTFE powder after evaporation of volatile components occupy 70% by weight based on the total composition. The resulting composition was sprayed onto a surface of an FRP substrate. Contact angle of water of this sample measured is 146°. Then, the sample was exposed to ultraviolet rays for 400 hours using SUNSHINE WEATHER METER (corresponding to outdoor exposure for 2 years). Thereafter, contact angle of water of the sample was measured. The result was 141°, indicating that the sample exhibits excellent weatherability.

EXAMPLE 3

PFA powder (specific surface area: 11 $m^2/g$; molecular weight: 20,000) was mixed with an acrylic-silicone resin so that the PFA powder after evaporation of volatile components occupy 70% by weight based on the total composition. The resulting composition was sprayed onto a surface of an FRP substrate. Contact angle of water of this sample measured is 150°. Then, the sample was exposed to ultraviolet rays for 400 hours using SUNSHINE WEATHER METER (corresponding to outdoor exposure for 2 years). Thereafter, contact angle of water of the sample was measured. The result was 144°, indicating that the sample exhibits excellent weatherability.

EXAMPLE 4

FEP powder (specific surface area: 9 $m^2/g$; molecular weight: 40,000) was mixed with an acrylic-silicone resin so that the FEP powder after evaporation of volatile components occupy 70% by weight based on the total composition. The resulting composition was sprayed onto a surface of an FRP substrate. Contact angle of water of this sample measured is 144°. Then, the sample was exposed to ultraviolet rays for 400 hours using SUNSHINE WEATHER METER (corresponding to outdoor exposure for 2 years). Thereafter, contact angle of water of the sample was measured. The result was 140°, indicating that the sample exhibits excellent weatherability.

EXAMPLE 5

PTFE powder (specific surface area: 48 $m^2/g$; molecular weight: 40,000) was mixed with an acrylic-silicone resin so that the PTFE powder after evaporation of volatile components occupy 70% by weight based on the total composition. The resulting composition was sprayed onto a surface of an FRP substrate. Contact angle of water of this sample measured is 147°. Then, the sample was exposed to ultraviolet rays for 400 hours using SUNSHINE WEATHER METER (corresponding to outdoor exposure for 2 years). Thereafter, contact angle of water of the sample was measured. The result was 143°, indicating that the sample exhibits excellent weatherability.

EXAMPLE 6

PTFE powder (specific surface area: 45 $m^2/g$; molecular weight: 10,000) was mixed with an acrylic-silicone resin so that the PTFE powder after evaporation of volatile components occupy 70% by weight based on the total composition. The resulting composition was sprayed onto a surface of an FRP substrate. Contact angle of water of this sample measured is 149°. Then, the sample was exposed to ultraviolet rays for 400 hours using SUNSHINE WEATHER METER (corresponding to outdoor exposure for 2 years). Thereafter, contact angle of water of the sample was measured. The result was 141°, indicating that the sample exhibits excellent weatherability.

EXAMPLE 7

PTFE powder (specific surface area: 14 $m^2/g$; molecular weight: 100,000) was mixed-with an acrylic-silicone resin so that the PTFE powder after evaporation of volatile components occupy 70% by weight based on the total composition. The resulting composition was sprayed onto a surface of an FRP substrate. Contact angle of water of this sample measured is 145°. Then, the sample was exposed to ultraviolet rays for 400 hours using SUNSHINE WEATHER METER (corresponding to outdoor exposure for 2 years). Thereafter, contact angle of water of the sample was measured. The result was 141°, indicating that the sample exhibits excellent weatherability.

COMPARATIVE EXAMPLE 1

Fluorinated pitch powder (specific surface area: 130 m$^2$/g; molecular weight: 3,000) was mixed with an acrylic-silicone resin so that the fluorinated pitch powder after evaporation of volatile components occupy 70% by weight based on the total composition. The resulting composition was sprayed onto a surface of an FRP substrate. Contact angle of water of this sample measured is 89°. The sample showed poor water repellency and inferior to the samples of the present invention.

COMPARATIVE EXAMPLE 2

Fluorinated pitch powder (specific surface area: 120 m$^2$/g; molecular weight: 50,000) was mixed with an acrylic-silicone resin so that the fluorinated pitch powder after evaporation of volatile components occupy 70% by weight based on the total composition. The resulting composition was sprayed onto a surface of an FRP substrate. Contact angle of water of this sample measured is 92°. The sample showed poor water repellency and inferior to the samples of the present invention.

COMPARATIVE EXAMPLE 3

PTFE powder (specific surface area: 9 m$^2$/g; molecular weight: 3,000) was mixed with an acrylic-silicone resin so that the PTFE powder after evaporation of volatile components occupy 70% by weight based on the total composition. The resulting composition was sprayed onto a surface of an FRP substrate. Contact angle of water of this sample measured is 94°. The sample showed poor water repellency and inferior to the samples of the present invention.

COMPARATIVE EXAMPLE 4

PTFE powder (specific surface area: 2 m$^2$/g; molecular weight: 7,000) was mixed with an acrylic-silicone resin so that the PTFE powder after evaporation of volatile components occupy 70% by i weight based on the total composition. The resulting composition was sprayed onto a surface of an FRP substrate. Contact angle of water of this sample measured is 87°. The sample showed poor water repellency and inferior to the samples of the present invention.

COMPARATIVE EXAMPLE 5

Fluorinated pitch powder (specific surface area: 1.5 m$^2$/g; molecular weight: 20,000) was mixed with an acrylic-silicone resin so that the fluorinated pitch powder after evaporation of volatile components occupy 70% by weight based on the total composition. The resulting composition was sprayed onto a surface of an FRP substrate. Contact angle of water of this sample measured is 92°. The sample showed poor water repellency and inferior to the samples of the present invention.

COMPARATIVE EXAMPLE 6

PFA powder (specific surface area: 0.3 m$^2$/g; molecular weight: 80,000) was mixed with an acrylic-silicone resin so that the PFA powder after evaporation of volatile components occupy 70% by weight based on the total composition. The resulting composition was sprayed onto a surface of an FRP substrate. Contact angle of water of this sample measured is 97°. The sample showed poor water repellency and inferior to the samples of the present invention.

COMPARATIVE EXAMPLE 7

PTFE powder (specific surface area: 60 m$^2$/g; molecular weight: 20,000) was mixed with an acrylic-silicone resin so that the PTFE powder after evaporation of volatile components occupy 70% by weight based on the total composition. The resulting composition was sprayed onto a surface of an FRP substrate. Contact angle of water of this sample measured is 91°. The sample showed poor water repellency and inferior to the samples of the present invention.

COMPARATIVE EXAMPLE 8

PTFE powder (specific surface area: 6 m$^2$/g; molecular weight: 80,000) was mixed with an acrylic-silicone resin so that the PTFE powder after evaporation of volatile components occupy 70% by weight based on the total composition. The resulting composition was sprayed onto a surface of an FRP substrate. Contact angle of water of this sample measured is 88°. The sample showed poor water repellency and inferior to the samples of the present invention. Further, cracks occurred in the resulting coating film, indicating poor quality.

COMPARATIVE EXAMPLE 9

PTFE powder (specific surface area: 40 m$^2$/g; molecular weight: 9,000) was mixed with an acrylic-silicone resin so that the PTFE powder after evaporation of volatile components occupy 70% by weight based on the total composition. The resulting composition was sprayed onto a surface of an FRP substrate. Contact angle of water of this sample measured is 84°. The sample showed poor water repellency and inferior to the samples of the present invention.

COMPARATIVE EXAMPLE 10

PTFE powder (specific surface area: 15 m$^2$/g; molecular weight: 120,000) was mixed with an acrylic-silicone resin so that the PTFE powder after evaporation of volatile components occupy 70% by weight based on the total composition. The resulting composition was sprayed onto a surface of an FRP substrate. Contact angle of water of this sample measured is 99°. The sample showed poor water repellency and inferior to the samples of the present invention. Further, the resulting coating was not uniform, had protrusions and depressions, and cracks so that its quality was poor.

COMPARATIVE EXAMPLE 11

PTFE powder (specific surface area: 20 m$^2$/g; molecular weight: 110,000) was mixed with an acrylic-silicone resin so that the PTFE powder after evaporation of volatile components occupy 70% by weight based on the total composition. The resulting composition was sprayed onto a surface of an FRP substrate. Contact angle of water of this sample measured is 104°. The sample showed poor water repellency and inferior to the samples of the present invention. Further, the resulting coating was not uniform, had protrusions and depressions, and cracks so that its quality was poor.

TABLE 1

| | Fluororesin Powder | Specific Surface Area (m²/g) | Molecular Weight | Contact Angle Initial (°) | Contact Angle After UV Irradiation (°) |
|---|---|---|---|---|---|
| Example | | | | | |
| 1 | PTFE powder | 24 | 20,000 | 153 | 148 |
| 2 | PTFE powder | 12 | 30,000 | 146 | 141 |
| 3 | PFA powder | 11 | 20,000 | 150 | 144 |
| 4 | FEP powder | 9 | 40,000 | 144 | 140 |
| 5 | PTFE powder | 48 | 40,000 | 147 | 143 |
| 6 | PTFE powder | 45 | 10,000 | 149 | 141 |
| 7 | PTFE powder | 14 | 100,000 | 145 | 141 |
| Comparative Example | | | | | |
| 1 | Fluorinated pitch powder | 130 | 3,000 | 89 | |
| 2 | Fluorinated pitch powder | 120 | 50,000 | 92 | |
| 3 | PTFE powder | 9 | 3,000 | 94 | |
| 4 | PTFE powder | 2 | 7,000 | 87 | |
| 5 | PTFE powder | 1.5 | 20,000 | 92 | — |
| 6 | PFA powder | 0.3 | 80,000 | 97 | — |
| 7 | PTFE powder | 60 | 20,000 | 91 | — |
| 8 | PTFE powder | 6 | 80,000 | 88 | — |
| 9 | PTFE powder | 40 | 9,000 | 84 | — |
| 10 | PTFE powder | 15 | 120,000 | 99 | — |
| 11 | PTFE powder | 20 | 110,000 | 104 | — |

Figure 4:
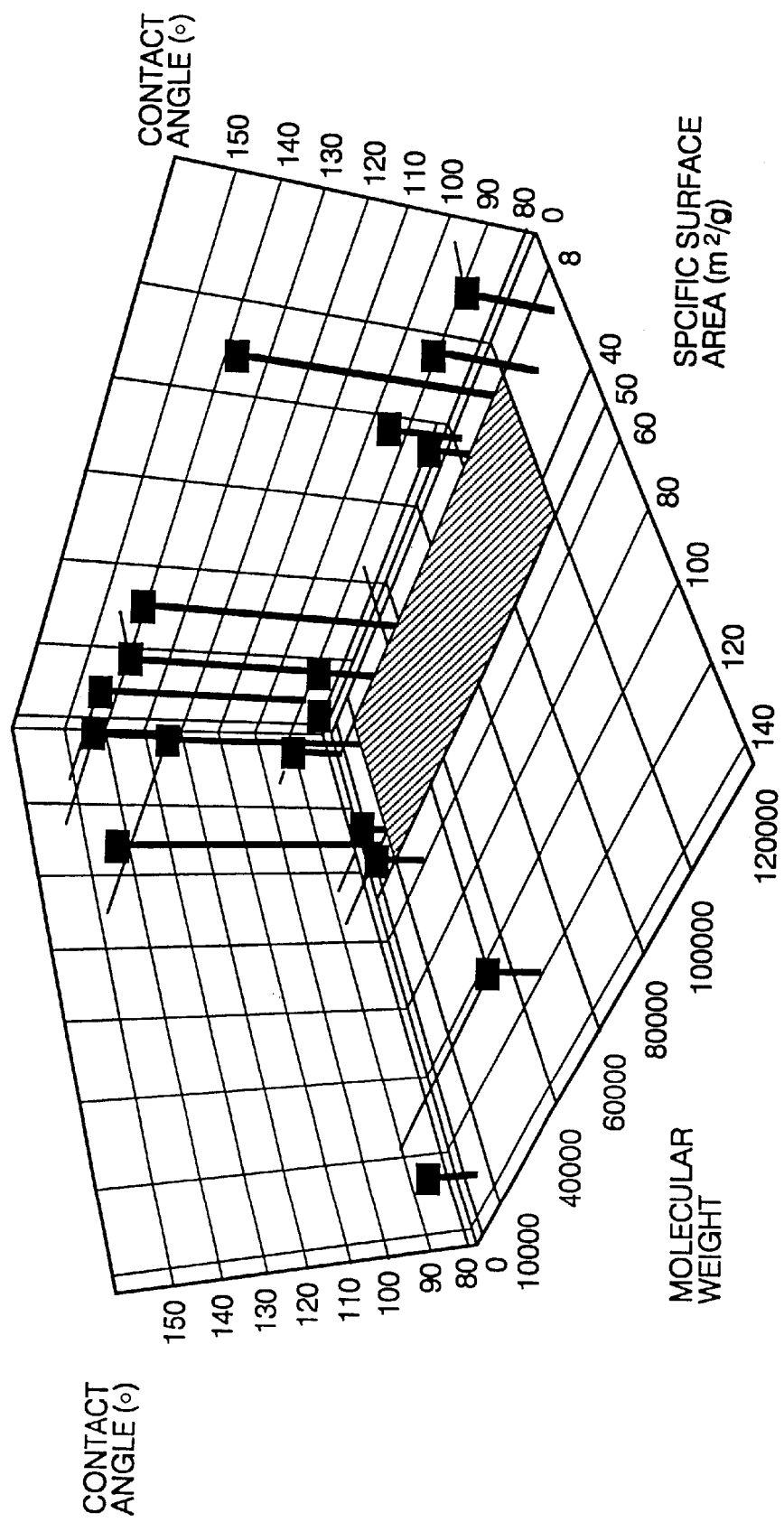
FIG. 4 is a graph three-dimensionally illustrating relationships between specific surface area or molecular weight and contact angle of water.

FIG. 4 illustrates relationship between specific surface area or molecular weight of the fluororesin and contact angle of water. As will be apparent from FIG. 4, the particular specific surface area and molecular weight of the fluororesin according to the present invention are important to water repellent effects and antisnow- or antiice-sticking effects.

EXAMPLE 8

Each of the water repellent coating compositions of Examples 1 to 7 was mixed with 1% by weight based on the total composition of phthalocyanine blue with stirring. After it was left to stand for 24 hours, the resulting mixture was coated on an FRP substrate. The coated sample exhibited normal blue color, indicating that the coating composition maintained a well dispersed state.

On the other hand, the water repellent coating compositions of Comparative Examples 1 to 10 were treated similarly to the above. Then, each of the resulting coating compositions showed pale color, thus failing to give a normal coating film. This would be presumed to be attributable to precipitation of a portion of the composition.

EXAMPLE 9

Figure 5:
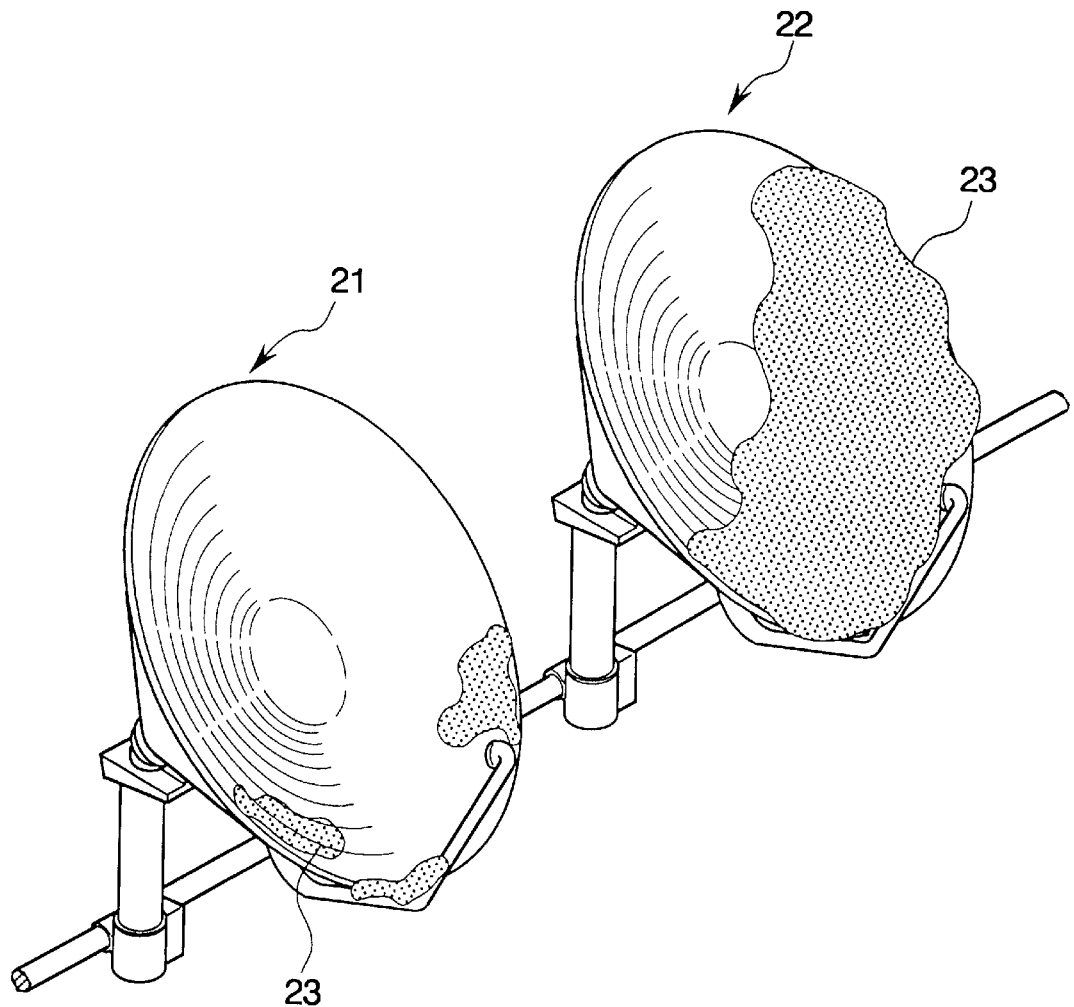
FIG. 5 is a schematic perspective view showing a coated antenna according to an embodiment of the present invention and a comparative uncoated antenna.

The water repellent coating compositions of Examples 1 to 7 each were coated onto a parabola antenna for satellite broadcasting as shown in FIG. 5. In FIG. 5, reference numeral 21 designates a coated parabola antenna and 22 is an uncoated parabola antenna. As shown, only a small amount of snow 23 deposited on a portion of the coated parabola antenna where wind swirled to form a snowdrift. In contrast, the parabola antenna 22 had much snow deposited on at least about 50% of the reception surface.

EXAMPLE 10

Figure 6:
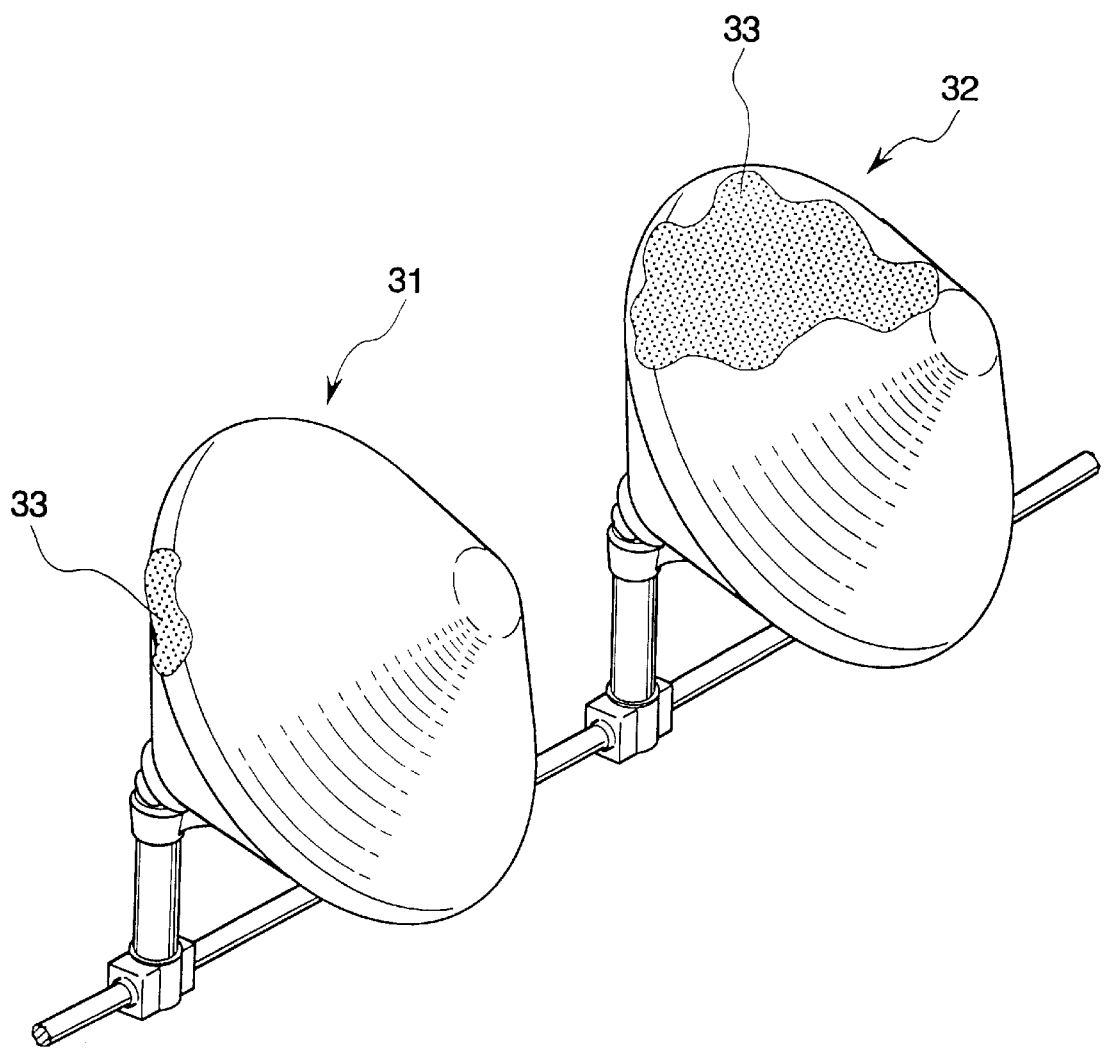
FIG. 6 is a schematic perspective view showing a coated radome according to an embodiment of the present invention and a comparative uncoated radome.

The water repellent coating compositions of Examples 1 to 7 each were coated onto a radome for antennae for radio communication as shown in FIG. 6. In FIG. 6, reference numeral 31 designates a coated radome and 32 is an uncoated radome. As shown in FIG. 6, a small amount of snow or ice 33 deposited only on a peripheral portion of the surface of the coated radome 31 while much snow or ice 33 deposited on the surface of the uncoated radome 32 covering the reception portion.

EXAMPLE 11

Figure 7:
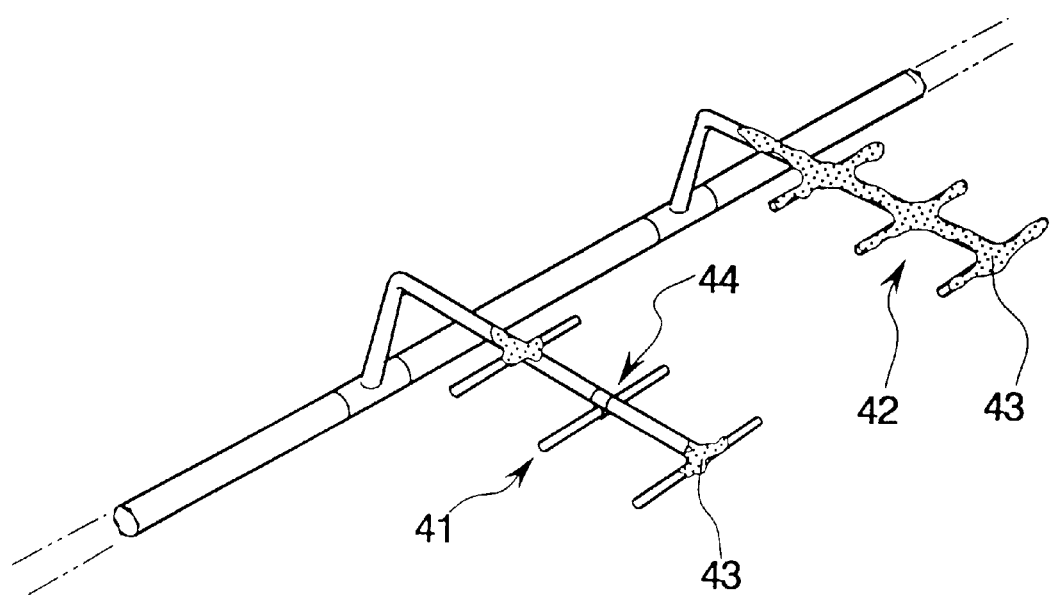
FIG. 7 is a schematic perspective view showing a coated Yagi antenna according to an embodiment of the present invention and a comparative uncoated Yagi antenna.

The water repellent coating compositions of Examples 1 to 7 each were coated onto a Yagi antenna for flight control as shown in FIG. 7. In FIG. 7, reference numeral 41 designates a coated Yagi antenna and 42 is an uncoated Yagi antenna. As shown, only a small amount of snow or ice 43 deposited on portions 44 of the coated Yagi antenna 41 where forks are connected. In contrast, the uncoated Yagi antenna 42 had much snow deposited all over the surfaces.

EXAMPLE 12

Figure 8:
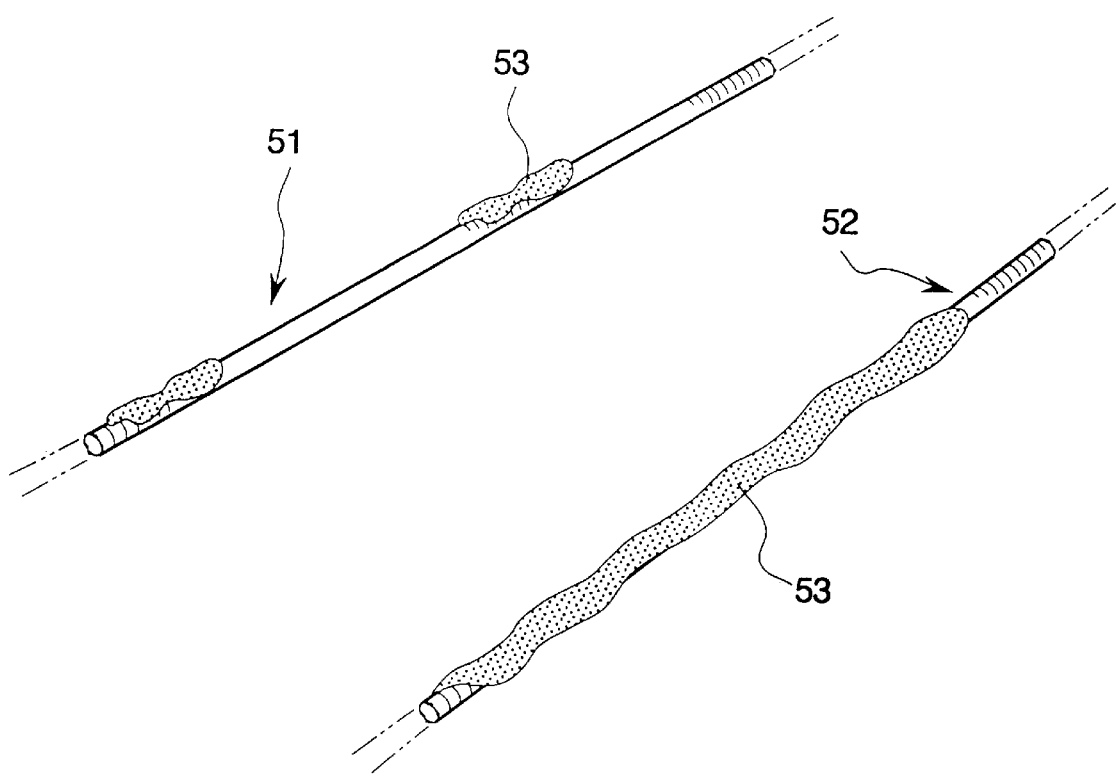
FIG. 8 is a schematic perspective view showing a coated transmission line according to an embodiment of the present invention and a comparative uncoated transmission line.

The water repellent coating compositions of Examples 1 to 7 each were coated onto a transmission line as shown in FIG. 8. In FIG. 8, reference numeral 51 designates a coated transmission line and 52 is an uncoated transmission line. As shown, only a small amount of snow or ice 53 deposited on a portion of the coated transmission line only intermittently. In contrast, the uncoated transmission line 52 had much snow or ice 53 deposited cylindrically on the line 52.

EXAMPLE 13

Figure 9:
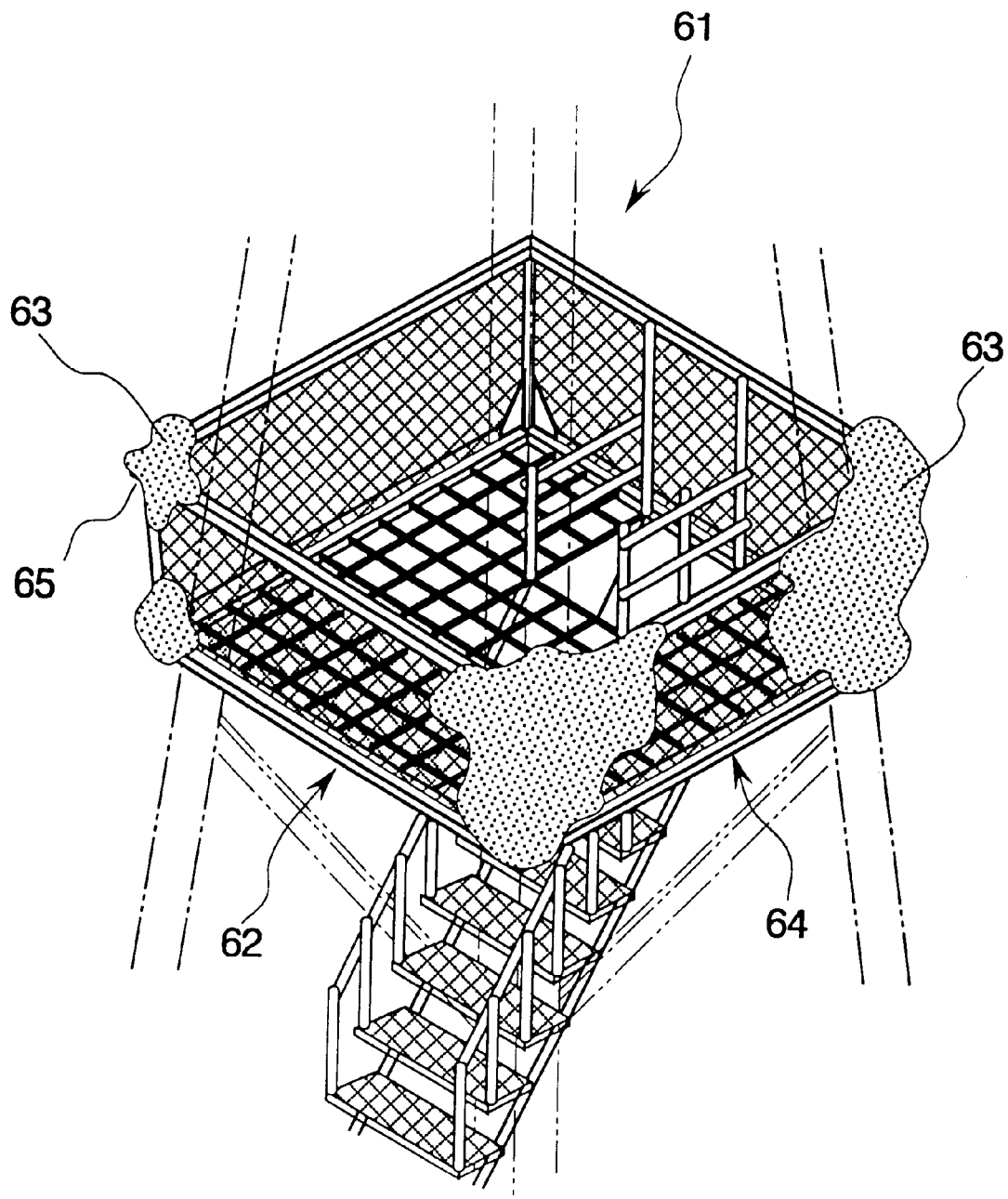
FIG. 9 is a schematic perspective view showing a part of an iron tower having a coated portion according to an embodiment of the present invention and a comparative uncoated portion.

The water repellent coating compositions of Examples 1 to 7 each were coated onto an iron tower as shown in schematic perspective in FIG. 9. In FIG. 9, reference numeral 61 is an iron tower, 62 is a coated portion of a fence surrounding a landing of a stairway provided with the iron tower 61, 63 is snow, and 64 is an uncoated portion of the fence, and 65 is a corner of the fence. As shown, only a small amount of snow 63 deposited on the corner 65 of the coated fence portion 62 (left hand side in the Figure). In contrast, the uncoated fence portion 63 (right hand side in the Figure) had much snow deposited on major portions of the fence including the corner 65.

EXAMPLE 14

Figure 10:
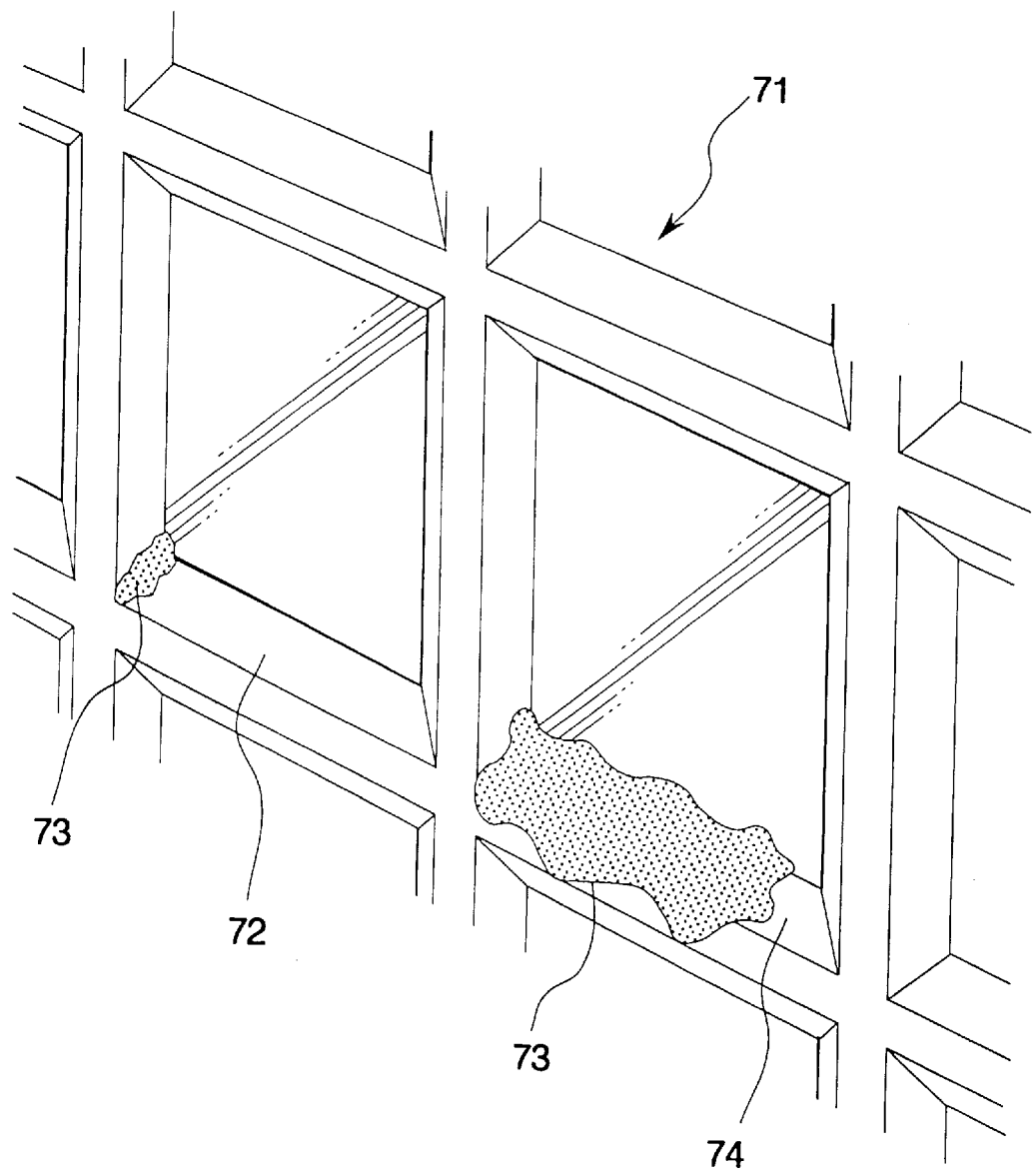
FIG. 10 is a schematic perspective view showing a part of an outer wall of a building having a coated portion according to an embodiment of the present invention and a comparative uncoated portion.

The water repellent coating compositions of Examples 1 to 7 each were coated onto an outer wall of a building as shown in a schematic perspective view in FIG. 10. In FIG. 10, reference numeral 71 designates an outer wall of a building, 72 is a coated window frame portion of the outer wall 71, 73 is snow or ice, and 74 is an uncoated window frame portion of the outer wall 71. As shown, only a small amount of snow 73 deposited on a corner of the coated window frame portion 72 of the outer wall 71. In contrast, the uncoated window frame portion 74 had much snow deposited all over the surface thereof.

EXAMPLE 15

Figure 11:
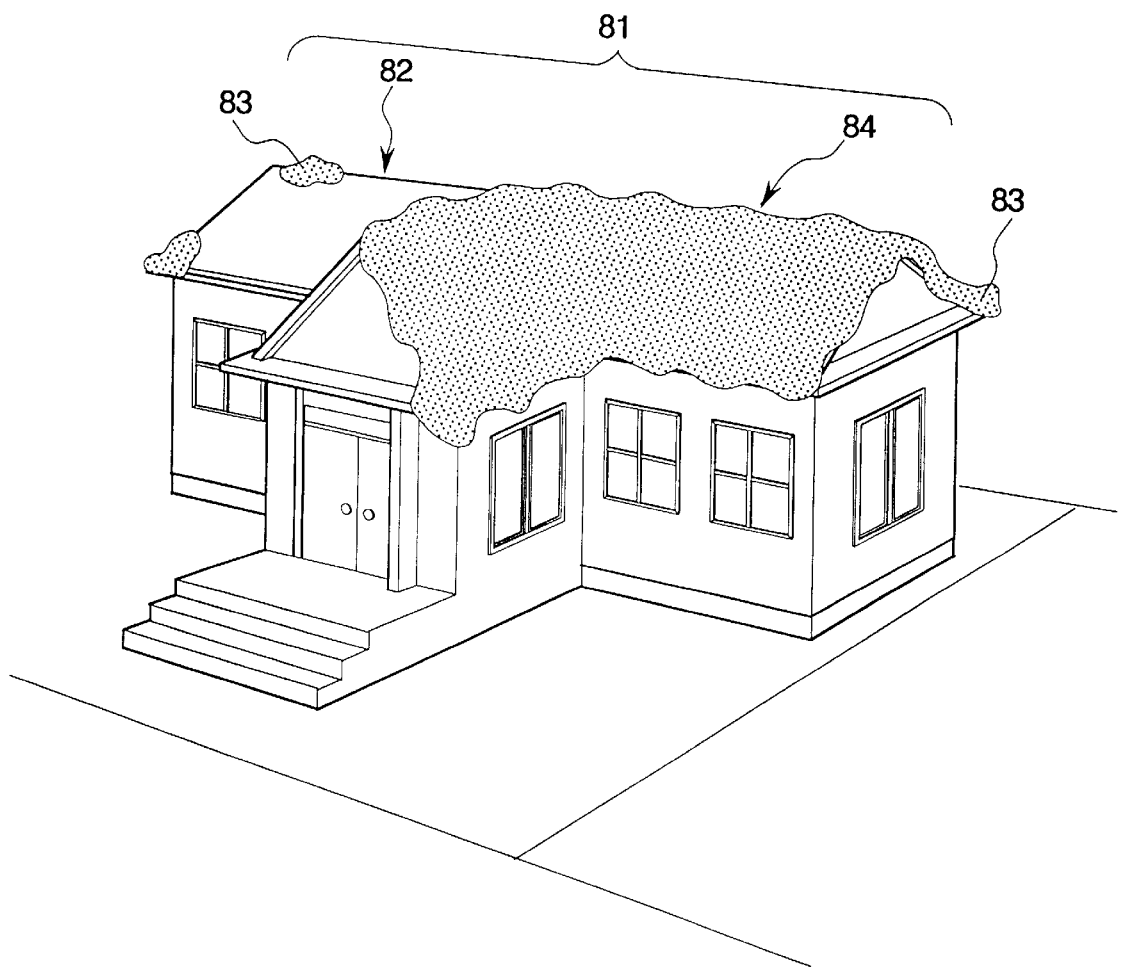
FIG. 11 is a schematic perspective view showing a house with a roof having a coated portion according to an embodiment of the present invention and a comparative uncoated portion.

The water repellent coating compositions of Examples 1 to 7 each were coated onto a roof of a house as shown in a schematic perspective view in FIG. 11. In FIG. 11, reference numeral 81 is a roof of a house, 82 is a coated portion of the roof 81, 83 is snow or ice, and 84 is an uncoated portion of the roof 81. As shown, snow or ice 83 deposited only in a small amount on the coated portion 82 (left hand side in FIG. 11) while it deposited in large amount all over the uncoated portion to a thickness of about 50 cm.

EXAMPLE 16

Figure 12:
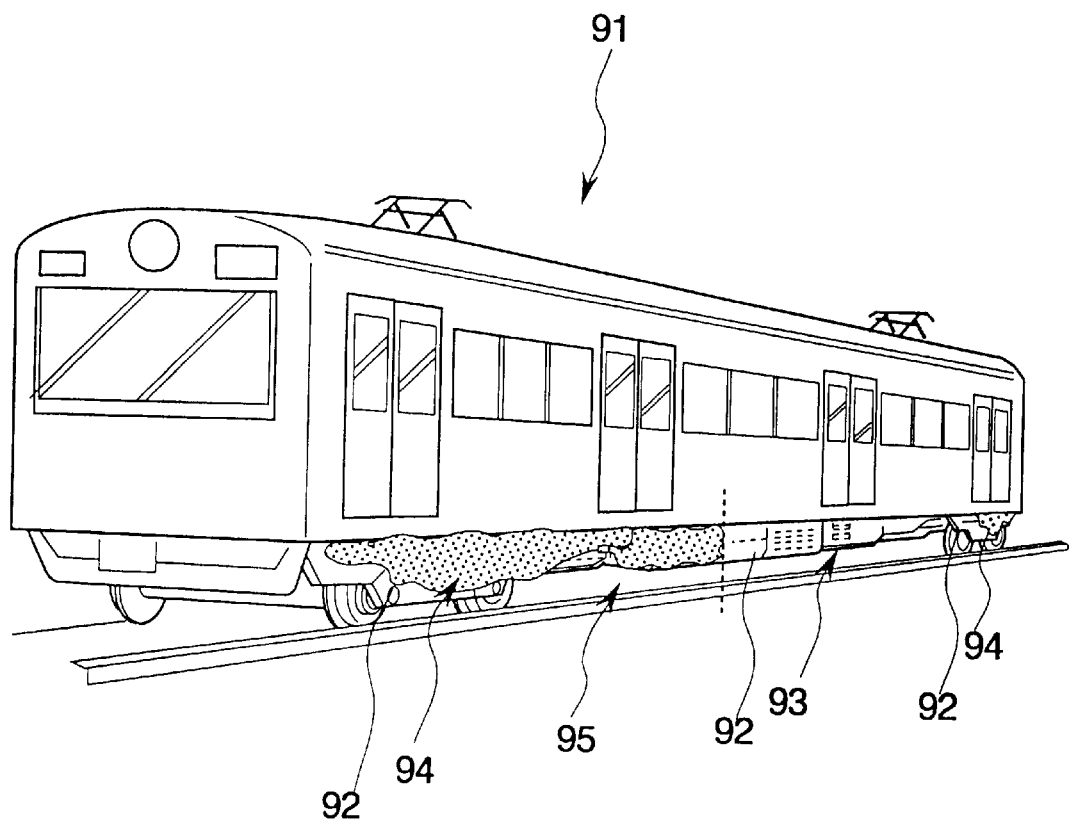
FIG. 12 is a schematic perspective view showing a rail road train with a lower cover having a coated portion according to an embodiment of the present invention and a comparative uncoated portion.

The water repellent coating compositions of Examples 1 to 7 each were coated onto a lower side guard plate of a railroad train as shown in a schematic perspective view in FIG. 12. In FIG. 12, reference numeral 91 designates a train (electric car), 92 is a lower part of the train 91, 93 is coated portion of the lower part of the train, 94 is snow or ice, and 95 is an uncoated portion of the lower portion of the train. As shown, in the case of the coated portion 93 (right hand side in FIG. 12), only a small amount of snow or ice 94 deposited only a rear region (as viewed in the direction of movement of the train or right hand side in FIG. 12) of the coated portion 93. On the contrary, in the case of the uncoated portion 95, snow or ice 94 deposited almost all over the uncoated portion.

EXAMPLE 17

Figure 13:
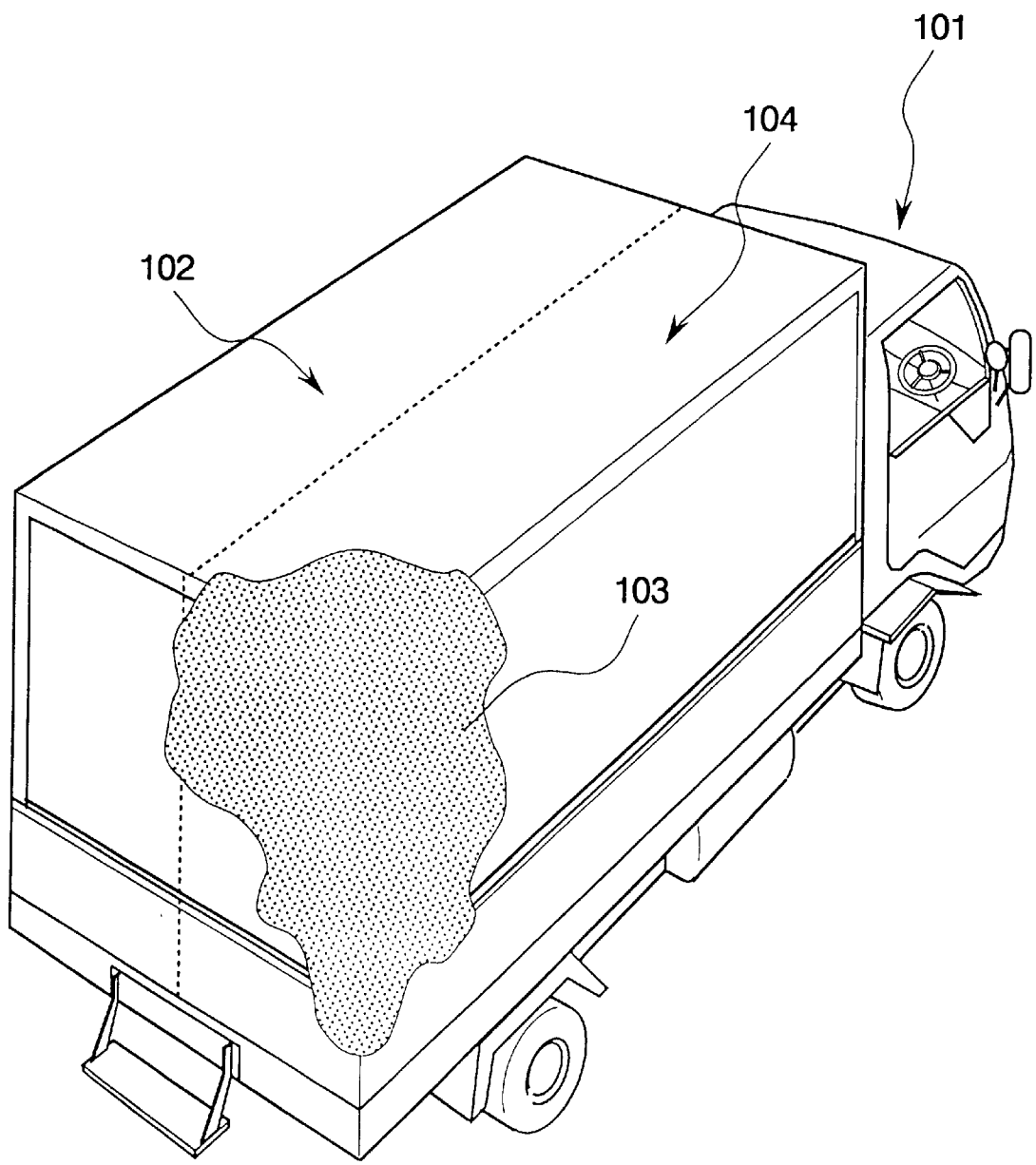
FIG. 13 is a schematic perspective view showing a truck having a coated portion according to an embodiment of the present invention and a comparative uncoated portion.

The water repellent coating compositions of Examples 1 to 7 each were coated onto an outer surface of a truck as shown in a schematic perspective view in FIG. 13. In FIG. 13, reference numeral 101 designates a truck, 102 is a coated portion of the outer surface of the truck, 103 is snow or ice, 104 is an uncoated portion of the outer surface of the truck. The outer surface of the truck was divided into two areas, i.e., coated and uncoated areas, by an imaginary central line as indicated in dotted line. As shown in FIG. 13, the coated portion 102 had substantially no snow or ice deposited thereon in contrast to the uncoated portion 104 where much snow or ice 103 deposited on the rear portion.

EXAMPLE 18

Figure 14:
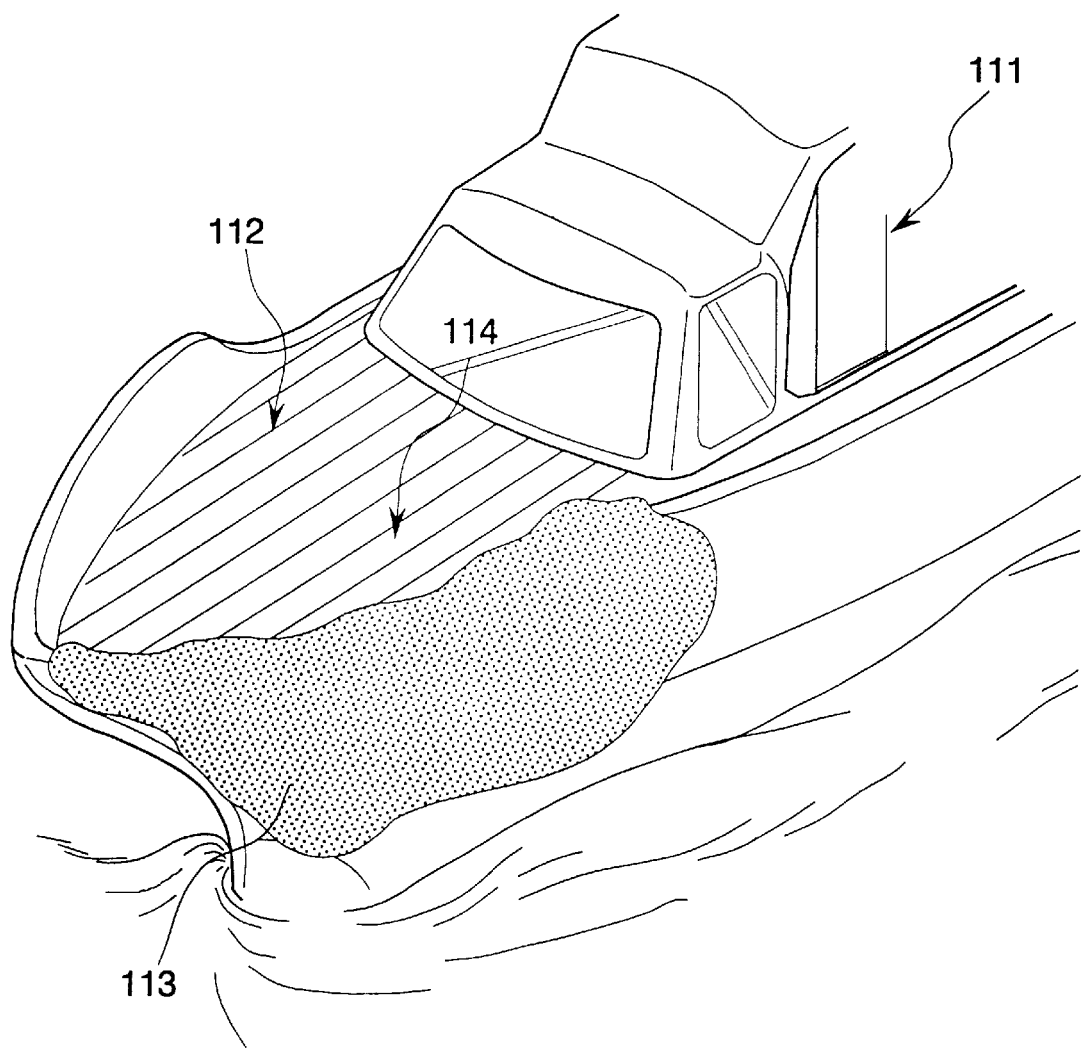
FIG. 14 is a schematic perspective view showing a ship having a coated portion according to an embodiment of the present invention and a comparative uncoated portion.

The water repellent coating compositions of Examples 1 to 7 each were coated onto a surface of a ship as shown in a schematic perspective view in FIG. 14. In FIG. 14, reference numeral 111 designates a ship, 112 is a coated portion of the ship surface, 113 snow or ice, and 114 is an uncoated portion of the ship surface. When the ship 111 was sailing in Northern seas in winter, as shown in FIG. 14, the coated portion 112 had substantially no snow or ice 113 whereas the uncoated portion 114 had much snow or ice thereon downward close to the water line.

EXAMPLE 19

Figure 15:
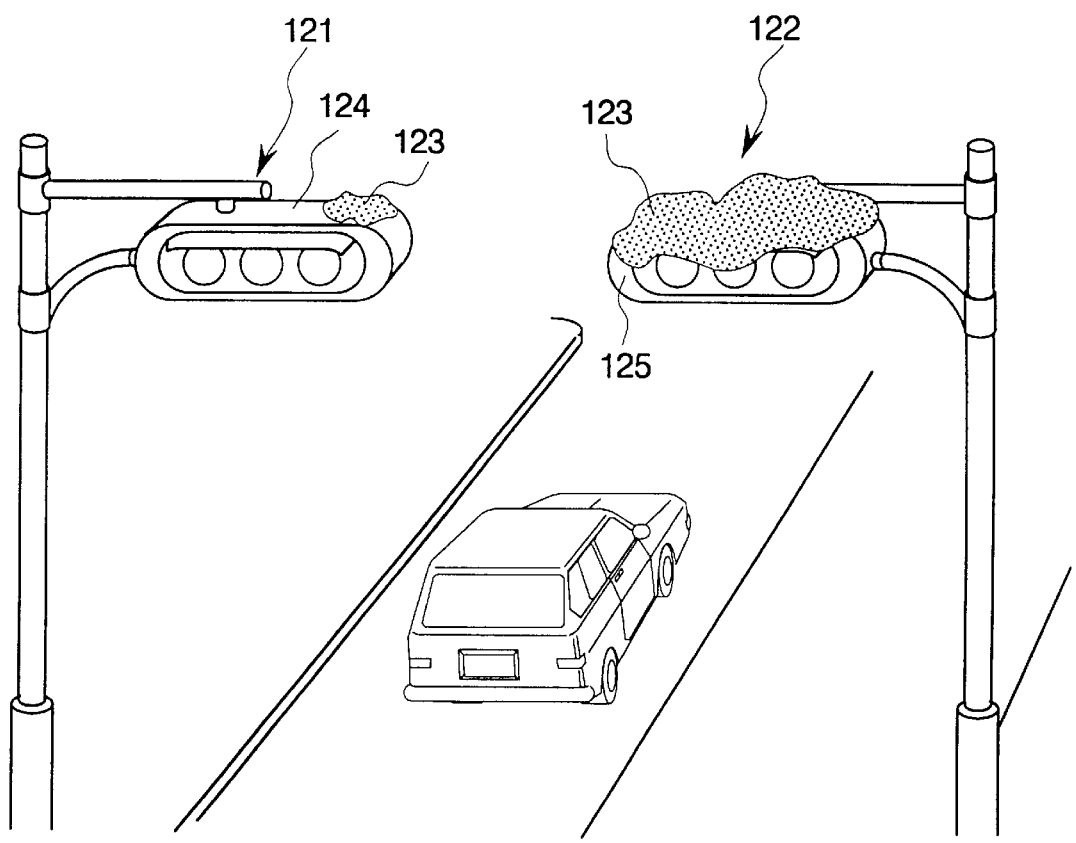
FIG. 15 is a schematic perspective view showing a signal having a coated hood according to an embodiment of the present invention and a comparative signal having an uncoated hood.

The water repellent coating compositions of Examples 1 to 7 each were coated onto a signal lamp as shown in a schematic perspective view in FIG. 15. In FIG. 15, reference numeral 121 designates a coated signal lamp, 122 is an uncoated signal lamp, 123 is snow or ice, and 124 is a hood of the signal lamp 121, and 125 is a hood of the signal lamp 122. As shown in FIG. 15, the hood 124 of the coated signal lamp 121 had only a small amount of snow or ice 123 on a part of thereof whereas the hood 125 of the uncoated signal lamp 122 had much snow or ice 123 all over the hood 125, with the mass of snow or ice 123 extending outwards from the hood 125.

EXAMPLE 20

Figure 16:
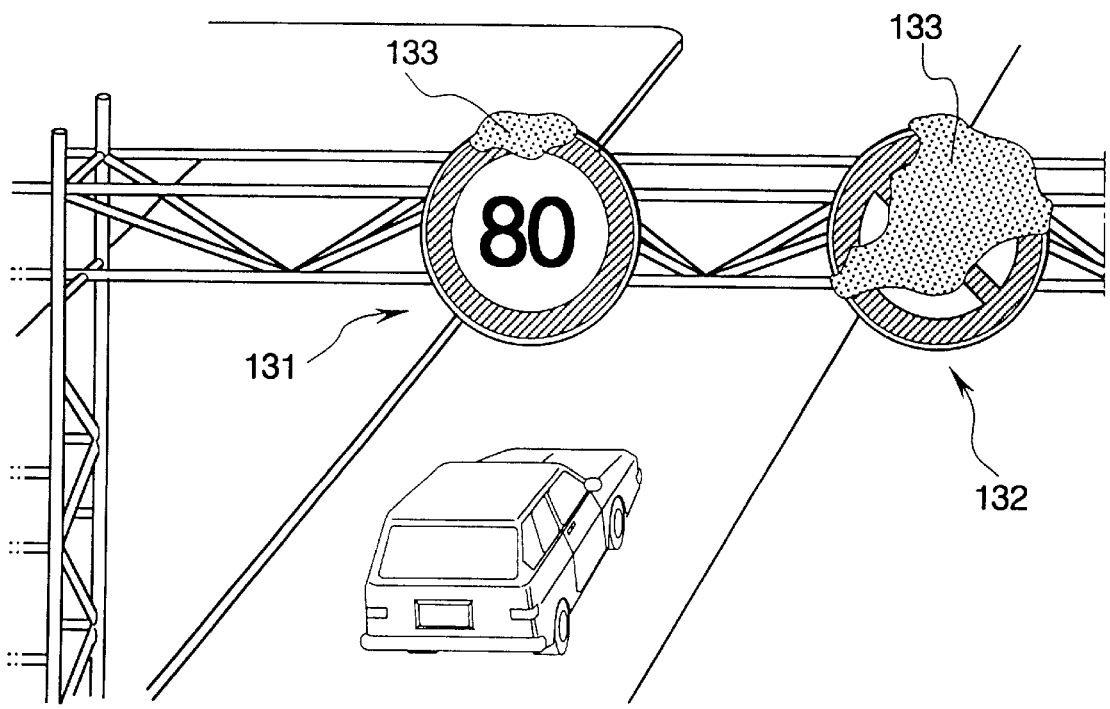
FIG. 16 is a schematic perspective view showing a coated mark plate according to an embodiment of the present invention and a comparative uncoated mark plate.

The water repellent coating compositions of Examples 1 to 7 each were coated onto a traffic control sign plate as shown in a schematic perspective view in FIG. 16. In FIG. 16, reference numeral 131 designates a coated traffic control sign plate, 132 is an uncoated traffic control sign plate, and 133 is snow or ice. As shown in FIG. 16, the coated traffic control sign plate 131 had only a small amount of snow or ice 133 on its upper portion while snow or ice 133 deposited on most of the surface of the uncoated traffic control sign plate 132, making it difficult to see the signal clearly.

The present invention will be understood more fully from the detailed description given hereinafter and from the accompanying drawings of the preferred embodiment of the invention, which, however, should not be taken to be limitative to the present invention, but are for explanation and understanding only.

What is claimed is:

1. A coating composition which is a suspension and which forms a water repellent coated film having a contact angle with water of not less than 140° after evaporation of volatile constituents therefrom, the coating composition comprising:

a solvent;

a fluororesin in powder form which is dispersed in the solvent, which has a specific surface area ranging from 27–48 $m^2/g$, which has a molecular weight ranging from 10,000 to 100,000, and which is not treated to be fluorinated to the ends of its molecular chain; and a binder comprised of acrylic-silicone resin.

2. The coating composition according to claim 1, wherein the fluororesin is at least one resin selected from the group consisting of polytetrafluoroethylene resins, tetrafluoroethylene/perfluoro-alkyl vinyl ether copolymer resins, and tetrafluoroethylene/hexafluoropropylene copolymer resins.

3. The coating composition according to claim 1, wherein the fluororesin is present in an amount ranging from 1 to 95% by weight based on total solids content.

4. A water repellent coated film having a contact angle with water of not less than 140°, comprising:

a fluororesin in powder form which has a specific surface area ranging from 27 to 48 $m^2/g$, which has a molecular weight ranging from 10,000 to 100,000, and which is not treated to be fluorinated to the ends of its molecular chain; and a binder comprised of acrylic-silicone resin.

5. The water repellent coated film according to claim 4, wherein the fluororesin is at least one resin selected from the group consisting of polytetrafluoroethylene resins, tetrafluoroethylene/perfluoro-alkyl vinyl ether copolymer resins, and tetrafluoroethylene/hexafluoropropylene copolymer resins.

6. The water repellent coated film according to claim 4, wherein the fluororesin is present in an amount ranging from 1 to 95% by weight based on total solids content.

7. An article coated with a water repellent coating, comprising:

a substrate; and a water repellent coating provided on the substrate, having a contact angle with water of not less than 140°, and being comprised of:

a fluororesin in powder form which has a specific surface area ranging from 27 to 48 $m^2/g$, which has a molecular weight ranging from 10,000 to 100,000, and which is not treated to be fluorinated to the ends of its molecular chain; and a binder comprised of acrylic-silicone resin.

8. The article according to claim 7, wherein the fluororesin is at least one resin selected from the group consisting of polytetrafluoroethylene resins, tetrafluoroethylene/ perfluoro-alkyl vinyl ether copolymer resins, and tetrafluoroethylene/hexafluoropropylene copolymer resins.

9. The article according to claim 7, wherein the fluororesin is present in an amount ranging from 1 to 95% by weight based on total solids content.

* * * * *